J. R. WALDO.
REEL.
APPLICATION FILED OCT. 20, 1913.

1,147,663.

Patented July 20, 1915.

Witnesses:
R. S. Perry
Merle Hammond

Inventor
John R. Waldo
By
Howard Thurso
Atty.

COLUMBIA PLANOGRAPH CO., WASHINGTON, D. C.

UNITED STATES PATENT OFFICE.

JOHN RALPH WALDO, OF LOS ANGELES, CALIFORNIA.

REEL.

1,147,663.　　Specification of Letters Patent.　Patented July 20, 1915.

Application filed October 20, 1913. Serial No. 796,177.

*To all whom it may concern:*

Be it known that I, JOHN RALPH WALDO, a citizen of the Dominion of Canada, residing at Los Angeles, in the county of Los Angeles, State of California, have invented new and useful Improvements in Reels, of which the following is a specification.

This invention relates to reels, and the principal object is to provide an automatically operated reel in which the locking mechanism is controlled by the cord or chain wound upon the same.

Another object is to provide a reel with a pivoted pawl through which the chain or cord is guided.

A further object is to provide an automatic reel primarily designed to support small objects attached to the person, such as eye glasses or pens, in which the direction of pull upon the cord locks or unlocks the reel by controlling the locking pawl thereof.

In reels heretofore constructed the reel releasing and locking mechanism sometimes fails to be in positive operation and thereby causes accidental winding of the cord, frequently resulting in breakage of the cord or reel mechanism. By means of my present invention the releasing and locking mechanism is instantly rendered operative and inoperative by change in the direction of the winding cord.

Figure 1:
Figure 2:
Figure 3:
Figure 4:
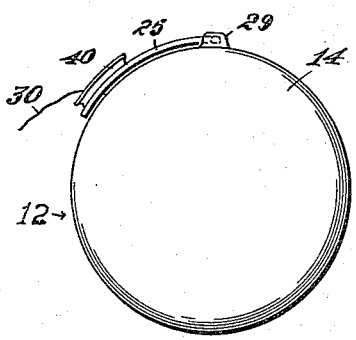
Figure 5:
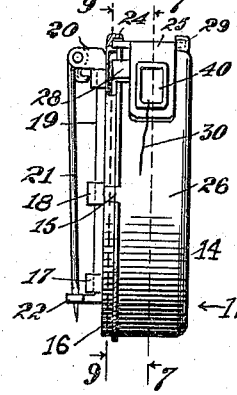
Figure 6:
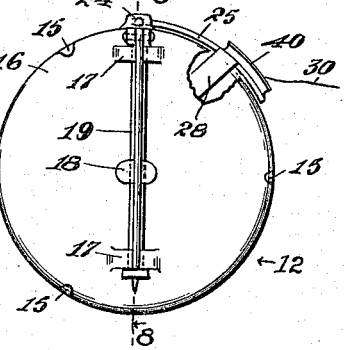
Figure 7:
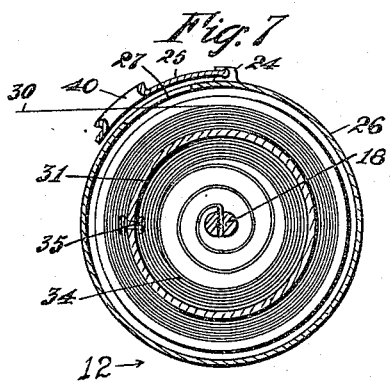
Figure 8:
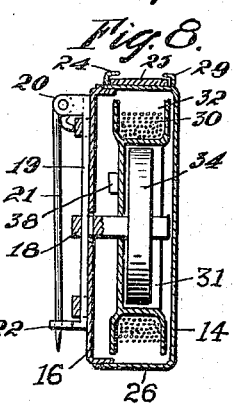
Figure 9:
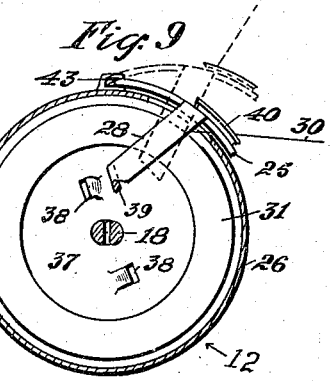
Figure 10:
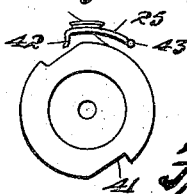

In the drawings accompanying this specification: Figure 1 is a view showing the reel applied to a garment, the position indicating the method of unwinding the reel. Fig. 2 is a similar view showing the reel locked and the object supported on the chain operative position. Fig. 3 is a view showing the direction to lift the pawl to permit the reel to rewind the cord thereon. Fig. 4 is an enlarged front view of the reel. Fig. 5 is a side view. Fig. 6 is a rear view thereof. Fig. 7 is a section on the line 7—7 of Fig. 5, viewed in the direction indicated by the arrows. Fig. 8 is a transverse section on the line 8—8 of Fig. 6, viewed in the direction indicated by the arrows. Fig. 9 is a section on the line 9—9 of Fig. 5 viewed in the direction indicated by the arrows. Fig. 10 is a detail elevation of the reel alone, showing a modification of the locking means therefor.

In the drawings, 12 designates the reel casing consisting of a flanged cover 14 having a plurality of bendable tongues 15 on its edge, which engage and maintain a flanged back plate 16 in rigid detachable connection with the cover 14. The back plate 16 is formed with apertured lugs 17 and has a centrally disposed orifice through which projects a split pin 18 having an aperture through which the base portion 19 of a safety pin carried by the lugs 17 extends. Pivotally mounted on a bifurcated arm 20 on the base portion 19 is a pin 21, the point of which is adapted to engage a hook 22 on the opposite end of the base portion 19. Oppositely disposed on the flanges of the cover 14 and back plate 16 are bearing lugs 24 and 29 in which are mounted trunnions formed on a pivoted pawl 25 adapted to lie against the annular wall 26 on the cover 14 and curved to conform thereto. The wall 26 is formed with a slot 27 through which a cord or chain 30 extends. A reel 31 having a peripheral groove 32 to receive and carry the cord is revolubly mounted on the split pin 18 within the casing; a coiled spring 34 having one end attached to the split pin 18 and its opposite end connected to a clip 35 on the reel 31, operates to yieldingly oppose the rotation of the reel to unwind the cord 30 therefrom and to rotate the reel to wind the cord thereon. Formed on the side plate 37 of the reel is a pair of teeth 38 which are adapted to be engaged by a finger 39 formed on an arm 28 carried by the pawl 25 and extending through an aperture in the flanged edge of the back plate 16. The pawl 25 extends over the aperture 27 in the wall 26 and is formed with an opening 40 which is disposed over the lower portion of the slot 27 through which opening 40 the cord extends, and this pawl 25 is normally positioned by gravity to dispose the finger 39 on the arm 28 in the path of travel of the teeth 38 when the reel 31 is rotated.

In the operation of the invention, the cord is unwound from the reel by pulling it in a downward direction as indicated in Fig. 1, thus holding the pawl 25 in its lowermost position with the finger 39 in position to engage the teeth 38 which ride under the finger when the reel is turning in the direction to unwind the cord. On releasing the pull on the cord the spring retracts the reel until a tooth 38 is engaged by the finger 39 to hold the reel against movement in opposition to the spring. The cord 30 may then be slackened, as shown in Fig. 2, without being rewound on the reel. When it is desired to rewind the cord 30 it is lifted, as shown in Fig. 3, so as to engage the end of the aperture 40 in the pawl 25, thus raising the latter, as indicated in dotted lines in Fig. 9, and moving the finger 39 out of the path of travel of the teeth 38. The spring 34 will then operate to rotate the reel to wind the cord thereon while the pawl is in its elevated position. The pawl 25 may thus be raised and lowered by operating the cord 30 so as to lock or unlock the reel at any desired point.

In the modified form of the invention illustrated in Fig. 10, the pawl 25 is formed with a finger 42 which extends through an opening in the casing in a position to engage notches 41 on the edge of the reel; the pawl 25 being formed with trunnions 43 which engage in the journals 24 and 29.

What I claim is:

1. An automatic reel, comprising a hollow casing, means to secure said reel to a garment, a resiliently operated reel mounted within said casing, a cord secured to said reel and arranged to be wound thereon, journals upon the exterior of the casing, a pawl pivotally secured thereto to lie adjacent the outer peripheral face of the casing, teeth formed on the reel, an extension on said pawl passing through an aperture in the casing, a finger on said extension adapted to engage said teeth, said pawl being so arranged as to be moved into or out of engagement by a change in the direction of pull in relation to said pawl.

2. An automatic reel, comprising a back plate having an orifice and lugs formed thereon, together with a rim having a journal, a dished casing having a wall adapted to embrace the rim of said back plate and having an orifice in said walls and a journal oppositely disposed to said journal on said back plate, a reel mounted within said casing, a flexible object supporting member secured upon said reel and arranged to exit through said casing, a headed split pin forming the axle for said reel, a clasp pin adapted to secure said split pin on said back plate and engaging with the lugs thereon, a spring secured to said split pin and said reel and arranged to wind the same, teeth formed upon the sides of said reel, an arcuate pawl having trunnions arranged to fit in said journals, an aperture in said pawl, an arm formed thereon, and a finger extending within said casing adapted to engage the teeth upon said reel.

In witness that I claim the foregoing I have hereunto subscribed my name this 13th day of October, 1913.

JOHN RALPH WALDO.

Witnesses:
W. P. KEENE,
MARIE BATTEY.

Copies of this patent may be obtained for five cents each, by addressing the "Commissioner of Patents, Washington, D. C."